United States Patent
Rodrigues-Morgado

(10) Patent No.: US 9,815,007 B2
(45) Date of Patent: Nov. 14, 2017

(54) DEVICE AND METHOD FOR CLEANING A HYDRAULIC CIRCUIT

(71) Applicant: Airbus Operations (SAS), Toulouse (FR)

(72) Inventor: Cedric Rodrigues-Morgado, Aucamville (FR)

(73) Assignee: Airbus Operations (SAS), Toulouse (FR)

(*) Notice: Subject to any disclaimer, the term of this patent is extended or adjusted under 35 U.S.C. 154(b) by 953 days.

(21) Appl. No.: 14/078,996

(22) Filed: Nov. 13, 2013

(65) Prior Publication Data

US 2014/0138328 A1    May 22, 2014

(30) Foreign Application Priority Data

Nov. 19, 2012    (FR) ..................................... 12 60971

(51) Int. Cl.
*B01D 35/02*    (2006.01)
*B08B 9/032*    (2006.01)
*F15B 21/04*    (2006.01)

(52) U.S. Cl.
CPC ............ *B01D 35/02* (2013.01); *B08B 9/0321* (2013.01); *F15B 21/041* (2013.01); *F15B 21/044* (2013.01)

(58) Field of Classification Search
CPC ... B01D 24/00; H02P 9/06; F01B 3/00; F15B 11/04; F15B 13/04
USPC .... 55/356, 310, 385.1; 210/237, 241, 416.1, 210/416.5, 168, 171, 244, DIG. 8, 218; 280/47, 2; 91/499; 322/38
See application file for complete search history.

(56) References Cited

U.S. PATENT DOCUMENTS

| | | | | |
|---|---|---|---|---|
| 2,425,848 | A * | 8/1947 | Vawter | B01D 25/00 134/107 |
| 5,775,103 | A | 7/1998 | Ingvast | |
| 6,207,051 | B1 * | 3/2001 | Anderson | B01D 46/2411 210/237 |
| 2009/0134848 | A1 * | 5/2009 | Boisvert | F15B 7/008 322/38 |
| 2009/0199879 | A1 * | 8/2009 | Reboa | B08B 3/026 134/123 |
| 2012/0125386 | A1 * | 5/2012 | Bertolucci | B08B 3/026 134/58 R |
| 2016/0230785 | A1 * | 8/2016 | Boisvert | F15B 13/0401 |

FOREIGN PATENT DOCUMENTS

WO    9815437    4/1998

OTHER PUBLICATIONS

French Search Report, dated Oct. 4, 2013.

* cited by examiner

*Primary Examiner* — Duane Smith
*Assistant Examiner* — Minh-Chau Pham
(74) *Attorney, Agent, or Firm* — Greer, Burns & Crain, Ltd.

(57) ABSTRACT

A device and a method for cleaning a hydraulic control circuit such as the hydraulic circuit serving to control a hydraulic element, for example, a cylinder/damper assembly used for controlling the angle of an aircraft landing gear assembly and providing shock absorption on landing. The device comprises a cleaning circuit comprising a filter that is connected to the control circuit instead of the controlled element.

20 Claims, 4 Drawing Sheets

DEVICE AND METHOD FOR CLEANING A HYDRAULIC CIRCUIT

CROSS-REFERENCES TO RELATED APPLICATIONS

This application claims the benefit of the French patent application No. 1260971 filed on Nov. 19, 2012, the entire disclosures of which are incorporated herein by way of reference.

BACKGROUND OF THE INVENTION

The present invention relates to the field of cleaning hydraulic circuits and more particularly the hydraulic circuit serving to control a hydraulic element such as, for example, a cylinder/damper assembly (known as a pitch trimmer) used for controlling the angle of a landing gear assembly and providing shock absorption on landing.

Modern aircraft have several landing gear assemblies. An aircraft such as the A380 marketed by Airbus (registered trademarks) has four landing gear assemblies, two at the level of the cockpit and another two at the level of the wings. Each of these landing gear assemblies has a pitch trimmer used to control the angle of the landing gear assembly for its retraction into the landing gear housing and to provide shock absorption on landing.

FIG. 1 shows diagrammatically the structure of the hydraulic control circuit. A hydraulic element 1.2, typically a pitch trimmer, is connected to a hydraulic control circuit 1.1, typically on board an aircraft. The hydraulic control circuit makes it possible to control the hydraulic element. A first circuit 1.3, known as the high-pressure circuit, makes it possible to transmit a force, by means of a hydraulic fluid, to the element 1.2. A second circuit 1.4, known as the low-pressure circuit, allows the hydraulic fluid to be returned to the control circuit 1.1.

When the hydraulic circuit is first filled, fluid is sent from the control circuit and progressively fills the entire the circuit. It proceeds throughout the circuit, finally reaching the controlled hydraulic element, in this case the pitch trimmer 1.2. When this takes place, particularly when the hydraulic fluid reaches the elements of the circuit for the first time, impurities may be collected by the fluid. Said impurities tend to accumulate in certain places in the circuit and particularly at the hydraulic element situated at the end of the circuit. There is then a risk that these impurities will interfere with the correct operation of the element and may even cause a blockage.

It is also important for a hydraulic control circuit to be completely free of air. Since air is compressible, the presence of an air bubble within the hydraulic circuit interferes with the effective transmission of force by the fluid between the control circuit and the controlled hydraulic element. Moreover, in the case of the pitch trimmers used in aviation, the tubing used to convey the fluid to the controlled element is typically made from Teflon-lined Kevlar. FIG. 2 shows the typical structure of a tube used in the hydraulic circuit in aviation. The tube 2.3 is connected to the controlled element 2.1 by a hydraulic coupling 2.2. The tube 2.3 is constituted by a Kevlar sleeve 2.6 lined with a thickness of Teflon 2.7. When the circuit is filled, fluid 2.4 comes into contact with air 2.5 in order to replace it. This type of tubing is designed to withstand hydraulic pressure but is very fragile in the presence of air in the circuit. As the controlled element is typically located at the end of the line of the hydraulic circuit, an accumulation of air tends to occur, leading to deterioration of the Teflon, which causes seepage. Inadequately purged tubes are therefore systematically damaged and must be replaced.

SUMMARY OF THE INVENTION

The invention makes it possible to solve at least one of the problems set out above. The object of the invention is thus a device and method for filling a hydraulic control circuit. The device comprises a cleaning circuit comprising a filter that is connected to the control circuit instead of the controlled element.

The invention relates to a device for cleaning a hydraulic control circuit, said hydraulic control circuit being used to control a hydraulic element and being connected to said element by a first circuit serving to transmit a force to said element by means of a hydraulic fluid and by a second circuit for the return of said fluid, which comprises an inlet connector allowing connection to the first circuit through which the hydraulic fluid arrives; an outlet connector allowing connection to the second circuit through which the clean fluid returns to the control circuit; a cleaning circuit allowing the fluid to flow between the inlet connector and the outlet connector; a hydraulic filter on said cleaning circuit for cleaning the potentially contaminated fluid arriving through the first circuit in order to return it clean to the control circuit. The hydraulic control circuit can thus easily be cleaned, improving the reliability of the circuit and the life of the tubing.

According to a particular embodiment, the device also comprises an inspection window for viewing the passage of hydraulic fluid in the cleaning circuit. An operator can thus monitor the moment when there are no more air bubbles mixed with the hydraulic fluid on filling.

According to a particular embodiment, the device also comprises an inlet valve on the cleaning circuit. It is thus possible to close the inlet of the device in order, for example, to protect the device during pressure increases.

According to a particular embodiment, the device also comprises a pressure limiter on the cleaning circuit. The outlet circuit, typically a low-pressure circuit, is thus protected from any high pressure in the control circuit.

According to a particular embodiment, the device also comprises a flow limiter on the cleaning circuit. It is thus ensured that the filling is carried out with a suitable flow rate and is compatible with the capabilities of the cleaner.

According to a particular embodiment, the device also comprises a drainage interface and a drain valve connected to the cleaning circuit. Draining the device is thus facilitated.

According to a particular embodiment, the device also comprises a kit of connection interfaces. Connecting the device to different elements is thus facilitated.

According to a particular embodiment, the kit of connection interfaces comprises a set of interfaces, known as coupling interfaces, allowing the device to be coupled to the hydraulic control circuit. Connecting the device to the control circuit is thus facilitated.

According to a particular embodiment, the kit of connection interfaces comprises a set of interfaces, known as drainage interfaces, for facilitating the drainage of the device after a filling operation.

According to a particular embodiment, the device also comprises a series of compartments for storing said interfaces. The interfaces and the appliance are thus available in a single device.

According to a particular embodiment, said compartments are in the form of a tube for storing the interface and a small piece of tubing in the lower portion of said tube for draining any residual hydraulic fluid. The cleaning of the interfaces and of the device is thus facilitated.

According to a particular embodiment, the device also comprises a holding tank in its lower portion for the recovery of the residual hydraulic fluid. Dispersion of residual hydraulic fluid is thus avoided.

According to a particular embodiment, the device also comprises a pressure gauge. An operator can thus monitor the pressure reached within the device.

According to a particular embodiment, the device comprises a dolly. Cleaning operations are thus facilitated.

The invention also relates to a method for cleaning a hydraulic control circuit, said hydraulic control circuit allowing the control of a hydraulic element and being connected to said element by a high-pressure circuit serving to transmit a force to said element by means of a hydraulic fluid and by a low-pressure circuit for the return of said fluid, which comprises a step of connecting the control circuit to a cleaning device according to the invention; a step of filling the control circuit in a closed circuit and a step of increasing the pressure in the control circuit; and a step of disconnecting said cleaning device. It is thus possible to clean a hydraulic control circuit easily within the device that contains it.

According to a particular embodiment, as the cleaning device comprises an inlet valve, the method also comprises a step of checking and positioning the inlet valve prior to filling, and a step of closing the inlet valve at the end of filling. It is thus ensured that the circuit is correctly filled and that there is no subsequent loss of hydraulic fluid.

According to a particular embodiment, as the cleaning device comprises a set of coupling interfaces and a set of drainage interfaces, the method also comprises a step of connecting the coupling interfaces prior to the step of connecting the control circuit to the cleaning device; a step of changing interfaces to connect the drainage interfaces after the disconnection of said cleaning device and then a step of draining said cleaning device.

According to a particular embodiment, the method is applied to the landing gear of an aircraft.

BRIEF DESCRIPTION OF THE DRAWINGS

Further advantages, aims and features of the present invention will become apparent from the following detailed description, given as a non-limitative example, with reference to the attached drawings, in which.

DETAILED DESCRIPTION OF THE PREFERRED EMBODIMENTS

The invention comprises a device for cleaning the control circuit of a hydraulic element. The device is provided for connection to the hydraulic tubes originating from the control circuit instead of the hydraulic element during the filling phase. Advantageously, this device necessarily has a filter allowing the fluid passing through it to be cleaned during the filling phase. This makes it possible to remove from the circuit the impurities collected by the fluid during its passage through the control circuit. The clean fluid is returned to the circuit in the low-pressure tube provided for the return of the fluid. In the embodiment of the invention, the device is also advantageously provided with an inspection window for viewing the passage of hydraulic fluid. The inspection window makes it possible to view the passage of the fluid and to monitor the possible presence of air in the fluid.

Figure 1:
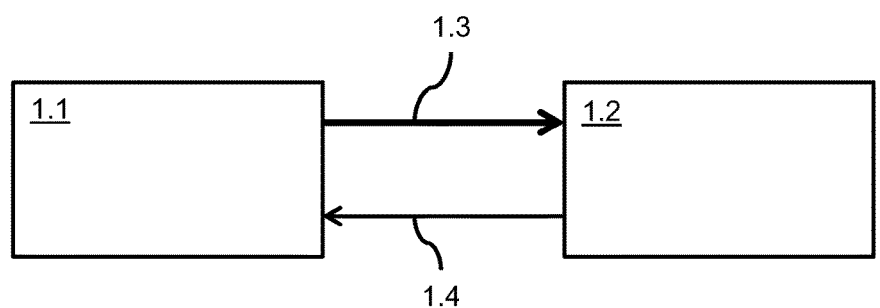
FIG. 1 diagrammatically shows the structure of a hydraulic control circuit.
Figure 2:
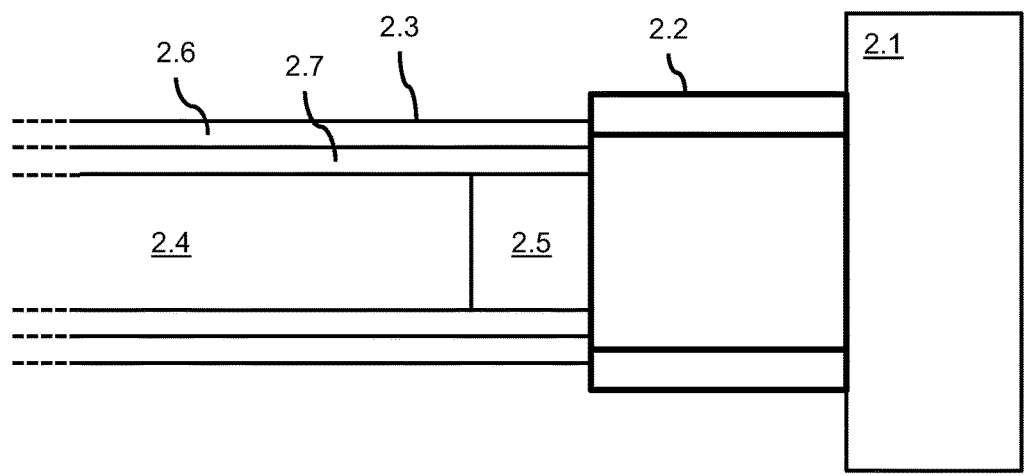
FIG. 2 shows the structure of an example hydraulic tube connected to a hydraulic element.
Figure 3:
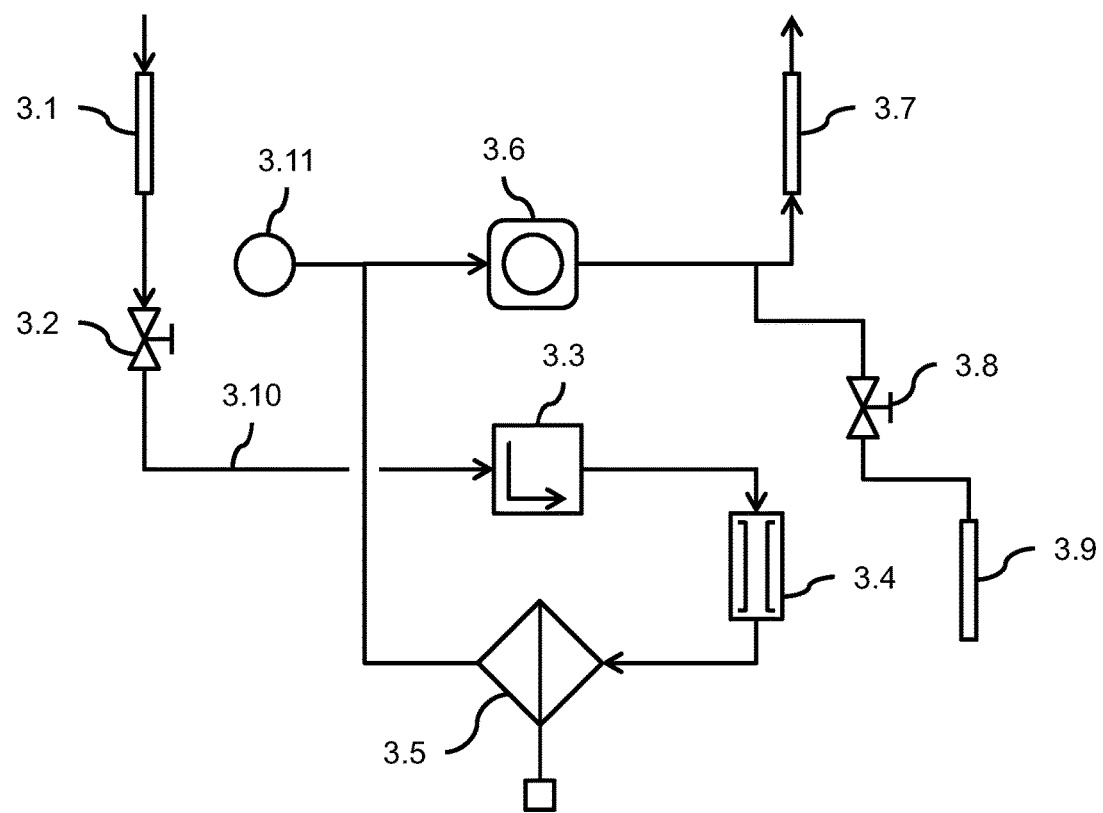
FIG. 3 shows the operating diagram of a device according to the embodiment of the invention.

FIG. 3 shows the operating diagram of a device according to the embodiment of the invention. The device comprises an inlet connector 3.1 allowing connection to the high-pressure circuit through which the fluid arrives, potentially contaminated, from the control circuit. It also has an outlet connector 3.7 allowing connection to the low-pressure circuit through which the clean fluid returns to the control circuit. Between these connectors, the fluid flows within a cleaning circuit 3.10. Said cleaning circuit comprises a main element constituted by a hydraulic filter 3.5. The function of said hydraulic filter is to clean the potentially contaminated fluid arriving through the high-pressure circuit in order to return it clean to the control circuit. The impurities are therefore retained in the filter without risking the accumulation thereof within the hydraulic element when it is reconnected to the circuit.

According to the embodiment of the invention, the device advantageously has an inlet valve 3.2. Said inlet valve makes it possible to open and close the fluid intake and thus control the operation of the device. The device advantageously comprises a pressure limiter 3.3 and a flow limiter 3.4 making it possible to ensure that the pressure and flow of the clean fluid sent to the low-pressure circuit are compatible with the capabilities thereof. The device also advantageously has an inspection window 3.6 for viewing the passage of hydraulic fluid. This inspection window can be constituted, for example, by a vane fluid flow indicator. On the one hand, it allows the passage of the fluid to be monitored in order to check correct operation of the device. It also makes it possible to monitor the presence or absence of air in the fluid. In the absence of such an indicator, a minimum operation time making it possible to ensure that air is completely removed must be observed. In order to facilitate maintenance operations on the device and particularly drainage, the device advantageously comprises a drainage interface 3.9 and a drain valve 3.8. Advantageously, the device is also equipped with a pressure gauge 3.11 allowing the user to check the pressure of the fluid present in the device. In the event of an excessive increase in pressure, it is thus possible to close the inlet valve to avoid subjecting the low-pressure circuit to excessive pressure.

In order to facilitate the operations of handling and draining the device, a kit of connection interfaces is advantageously provided. A first set of interfaces, known as coupling interfaces, allows the device to be joined to the tubing of the aircraft. Said interfaces are connected on the one hand to the inlet and outlet connectors of the device and on the other hand to the tubes of the control circuit. A second set of interfaces, known as drainage interfaces, is advantageously provided to facilitate the drainage of the device after a filling operation.

Figure 4:
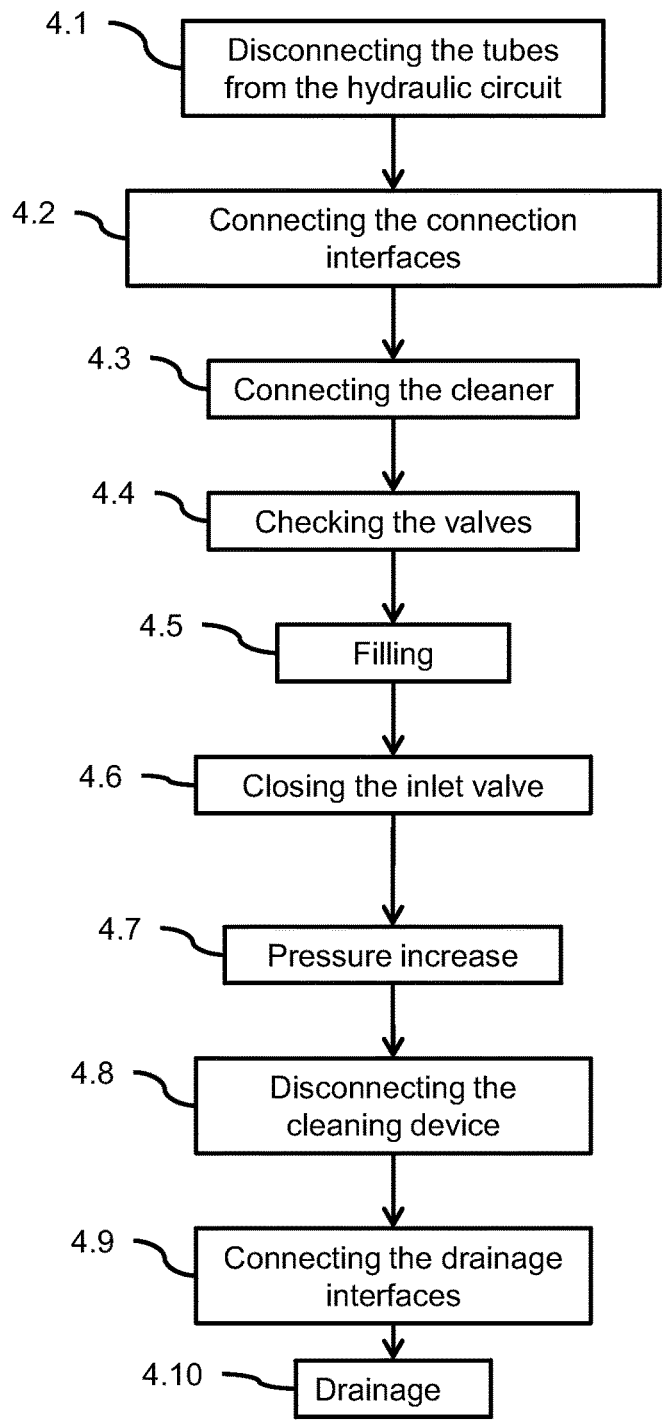
FIG. 4 shows the different steps of the method according to an embodiment of the invention.

FIG. 4 shows the different steps of the method according to an embodiment of the invention. Typically, before starting filling and cleaning, the tubes from the hydraulic control circuit are connected to the hydraulic element, constituted in the embodiment by the pitch trimmer. Consequently, the first step 4.1 comprises disconnecting said tubes from the hydraulic element. Said tubes must then be connected to the cleaning device. This can be done directly if the connectors are compatible. In the embodiment, a set of coupling interfaces is used. The tubes are therefore firstly connected to the coupling interfaces during step 4.2. Then during step 4.3 said coupling interfaces are connected to the cleaning device.

Once the device is thus connected to the hydraulic control circuit directly or using the coupling interfaces, during step 4.4 the positioning of the valves of the device is checked. In the embodiment, as the cleaning device is provided with an inlet valve and a drain valve for maintenance, it is necessary to open the inlet valve and close the drain valve. Filling can then take place in a closed circuit during step 4.5. During filling with hydraulic fluid, the fluid will pass through all of the hydraulic tubing constituting the hydraulic control circuit of the aircraft until it reaches the cleaning device. The inspection window 3.6 for viewing the passage of hydraulic fluid indicates the passage of fluid to the operator. At the start of filling, a fluid/air mixture will pass, then after a certain period of time, in the embodiment typically about fifteen minutes, only hydraulic fluid can be seen in the inspection window. Allowing the fluid to flow in a closed circuit makes it possible to remove the air and start cleaning.

The inlet valve can then be closed during step 4.6. A pressure increase step 4.7 can then take place. Said pressure increase makes it possible to improve the cleaning of the tubing. There is no risk of deterioration of the tubing of the low-pressure circuit by the increase in pressure, because the inlet valve is closed. During the pressure increase, the hydraulic pressure can rise to 350 bar. The Kevlar tubing is then correctly purged and the circuit is cleaned and decontaminated.

The cleaning device can then be disconnected from the hydraulic control circuit without disconnecting the coupling interfaces during step 4.8. At this stage the cleaning device contains hydraulic fluid that must be drained. Advantageously, when they are provided, the coupling interfaces are then replaced by the drainage interfaces in a step 4.9. According to an advantageous embodiment, the drainage interfaces are connected to the coupling interfaces. Thus, the drainage operation is used to drain the coupling interfaces and the cleaning device. In step 4.10, these latter make it possible to drain the cleaning device, i.e. to drain away the hydraulic fluid that it contains. Advantageously, this drainage is carried out to a recovery tank located in a storage space within the cleaning device. The hydraulic element is typically reconnected to the control circuit during this step. Said element itself would have been purged in the meantime, although this operation is not described here.

The device is then ready for a new operation of cleaning and filling a hydraulic control circuit.

Figure 5:
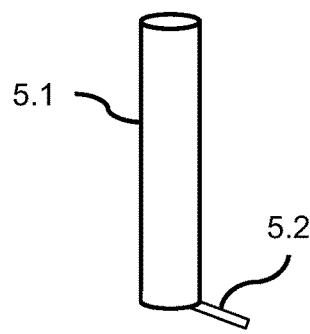
FIG. 5 shows a storage compartment for a connection interface according to the embodiment of the invention.

Advantageously, the cleaning device has compartments for storing the coupling and drainage interfaces when they are present. FIG. 5 shows a storage compartment for a connection interface according to the embodiment of the invention. This compartment is in the form of a tube 5.1 fixed on one of the faces of the cleaning device. The device comprises as many compartments as interfaces, four in the embodiment. Advantageously, the tube is equipped with a small piece of tubing 5.2 in its lower portion for draining any residual hydraulic fluid that might accumulate at the base of the tube. Said residual fluid is advantageously collected in a holding tank situated at the base of the cleaning device.

Advantageously, the cleaning device comprises a dolly. The dolly makes it possible to group together the device itself, the holding tank and the interface storage compartments. The cleaning device then constitutes a complete, mobile and independent unit for operating on aircraft.

Figure 6:
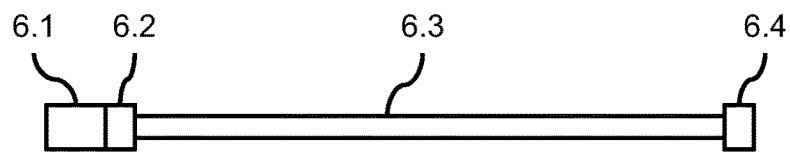
FIGS. 6 to 9 show the structure of the connection interfaces in an embodiment of the invention.

FIG. 6 shows the structure of the coupling interface between the low-pressure circuit and the outlet connector of the cleaning device. It is constituted by a tubing cap 6.1 and a hydraulic coupling 6.2, in the embodiment an ABS 1385 Dash 12 standard coupling. It comprises a hydraulic tube 6.3 and finally a self-sealing coupling 6.4, of the female Dash 12 type in the embodiment.

Figure 7:
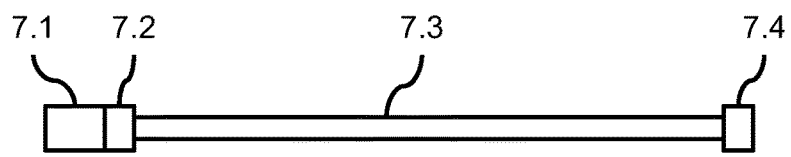

FIG. 7 shows the structure of the coupling interface between the high-pressure circuit and the inlet connector of the cleaning device. It is constituted by a tubing cap 7.1 and a hydraulic coupling 7.2, in the embodiment an ABS1385 Dash 10 standard coupling. It comprises hydraulic tubing 7.3 and finally a self-sealing coupling 7.4, of the male Dash 10 type in the embodiment.

Figure 8:
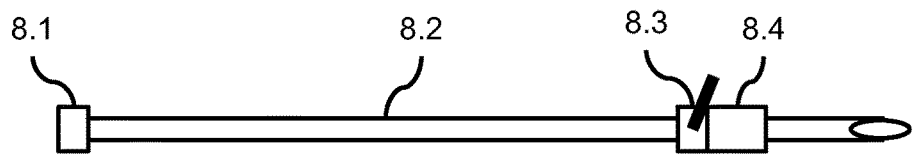

FIG. 8 shows the structure of the drainage interface intended to be connected to the outlet connector of the cleaning device. It is constituted by a self-sealing coupling 8.1, in the embodiment a male Dash 12 coupling. It comprises hydraulic tubing 8.2, a quarter-turn tap 8.3 used to control the drainage, and a cannula 8.4 for facilitating the recovery of the fluid during drainage.

Figure 9:
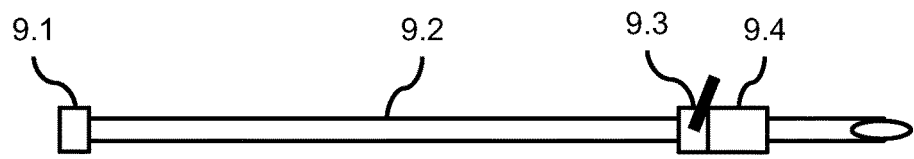

FIG. 9 shows the structure of the drainage interface intended to be connected to the inlet connector of the cleaning device. It is constituted by a self-sealing coupling 9.1, a female Dash 10 coupling in the embodiment. It comprises hydraulic tubing 9.2, a quarter-turn tap 9.3 used to control the drainage, and a cannula 9.4 for facilitating the recovery of the fluid during drainage.

A person skilled in the art will understand that the interfaces described here are linked to the application in question and that other interfaces corresponding to other hydraulic circuits can be used without exceeding the scope of the invention. A hydraulic circuit cleaning device according to the invention can be used for filling and cleaning any type of hydraulic control circuit. Naturally, to meet specific needs, a person competent in the field of the invention could modify the above description.

Although the present invention has been described above with reference to specific embodiments, the present invention is not limited to the specific embodiments and modifications within the field of application of the present invention will be obvious to a person skilled in the art.

The invention claimed is:

1. A device for cleaning a hydraulic control circuit, said hydraulic control circuit allowing the control of a hydraulic element and being connected to said element by a first circuit serving to transmit a force to said element by means of a hydraulic fluid and by a second circuit for the return of said fluid to said control circuit, said device comprising:
   an inlet connector configured to connect the device to the first circuit and through which the hydraulic fluid arrives;
   an outlet connector configured to connect the device to the second circuit and through which clean hydraulic fluid returns to the hydraulic control circuit;
   a cleaning circuit allowing the hydraulic fluid to flow between the inlet connector and the outlet connector; and,
   a hydraulic filter on said cleaning circuit for cleaning potentially contaminated hydraulic fluid arriving through the first circuit in order to return the clean hydraulic fluid to the control circuit, wherein the device is connected between the hydraulic element and the hydraulic control circuit such that hydraulic fluid passes from the hydraulic control circuit to the cleaning circuit instead of to the hydraulic element.

2. The device according to claim 1, wherein said device also comprises an inspection window for viewing the passage of hydraulic fluid through the cleaning circuit.

3. The device according to claim 1, wherein said device also comprises an inlet valve on the cleaning circuit.

4. The device according to claim 1, wherein said device also comprises a pressure limiter on the cleaning circuit.

5. The device according to claim 1, wherein said device also comprises a flow quantity limiter on the cleaning circuit.

6. The device according to claim 1, wherein said device also comprises a drainage interface and a drain valve connected to the cleaning circuit.

7. The device according to claim 1, wherein said device also comprises a kit of connection interfaces.

8. The device according to claim 7, wherein the kit of connection interfaces comprises a set of interfaces, known as coupling interfaces, allowing the device to be coupled to the hydraulic control circuit.

9. The device according to claim 7, wherein the kit of connection interfaces comprises a set of interfaces, in the form of drainage interfaces, to facilitate the drainage of the device after a filling operation.

10. The device according to claim 7, wherein said device also comprises a series of compartments for storing said interfaces.

11. The device according to claim 10, wherein said compartments are in the form of a tube for storing the interface and a small piece of tubing in the lower portion of said tube for draining any residual hydraulic fluid.

12. The device according to claim 1, wherein said device also comprises a holding tank in its lower portion for the recovery of the residual hydraulic fluid.

13. The device according to claim 1, further comprising a pressure gauge.

14. The device according to claim 1, further comprising a dolly.

15. A method for cleaning a hydraulic control circuit, said hydraulic control circuit being used to control a hydraulic element and being connected to said element by a high-pressure circuit serving to transmit a force to said element via a hydraulic fluid and by a low-pressure circuit for the return of said fluid to the control circuit, the method comprising the steps:
connecting the control circuit rather than the controlled element to a cleaning device according to claim 1;
filling the control circuit with hydraulic fluid in a closed circuit;
increasing a pressure of the hydraulic fluid in the control circuit; and
disconnecting said cleaning device.

16. The method according to claim 15, said cleaning device comprising an inlet valve and further comprising the steps:
checking and positioning the inlet valve, prior to filling; and
closing the inlet valve at the end of filling.

17. The method according to claim 15, said cleaning device comprising a set of coupling interfaces and a set of drainage interfaces, and further comprising the steps:
connecting coupling interfaces prior to the step of connecting the control circuit to the cleaning device;
changing interfaces to connect the drainage interfaces after disconnection of said cleaning device; and
then draining said cleaning device.

18. A device for cleaning a hydraulic control circuit comprising:
a dolly;
a cleaning circuit disposed on the dolly and comprising an inlet, an outlet, and a pressure limiter disposed between the inlet and the outlet, the inlet connected with a hydraulic control element and receiving high pressure hydraulic fluid capable of transmitting a force from the hydraulic control element to a hydraulic element and the outlet connected with the hydraulic control element and providing cleaned hydraulic fluid to the hydraulic control element, the clean hydraulic fluid having a lower pressure than the high pressure hydraulic fluid;
a hydraulic filter on said cleaning circuit for cleaning potentially contaminated hydraulic fluid arriving through the inlet connector in order to provide the clean hydraulic fluid;
a window disposed between the outlet and the hydraulic filter; and,
a plurality of connection interfaces, the connection interfaces including a coupling interface for the inlet and the outlet, and a drainage interface for the drain.

19. The device of claim 18 further comprising:
a storage compartment disposed on the dolly and configured to receive the plurality of connection interfaces.

20. A device for cleaning a hydraulic control circuit comprising:
a cleaning circuit comprising an inlet and an outlet, the inlet connected with a hydraulic control element and being configured to receive hydraulic fluid and the outlet connected with the hydraulic control element and being configured to provide cleaned hydraulic fluid;
a hydraulic filter on said cleaning circuit for cleaning potentially contaminated hydraulic fluid arriving through the inlet connector in order to provide the clean hydraulic fluid;
a flow limiter on said cleaning circuit between the hydraulic filter and the inlet;
a pressure limiter on said cleaning circuit between the flow limiter and the inlet;
a window on said cleaning circuit between the outlet and the hydraulic filter; and,
a plurality of connection interfaces, the connection interfaces including a coupling interface for the inlet and the outlet, and a drainage interface for the drain.

* * * * *